C. D. MYER.
HOSE CONNECTION.
APPLICATION FILED NOV. 21, 1910.
1,006,671.
Patented Oct. 24, 1911.
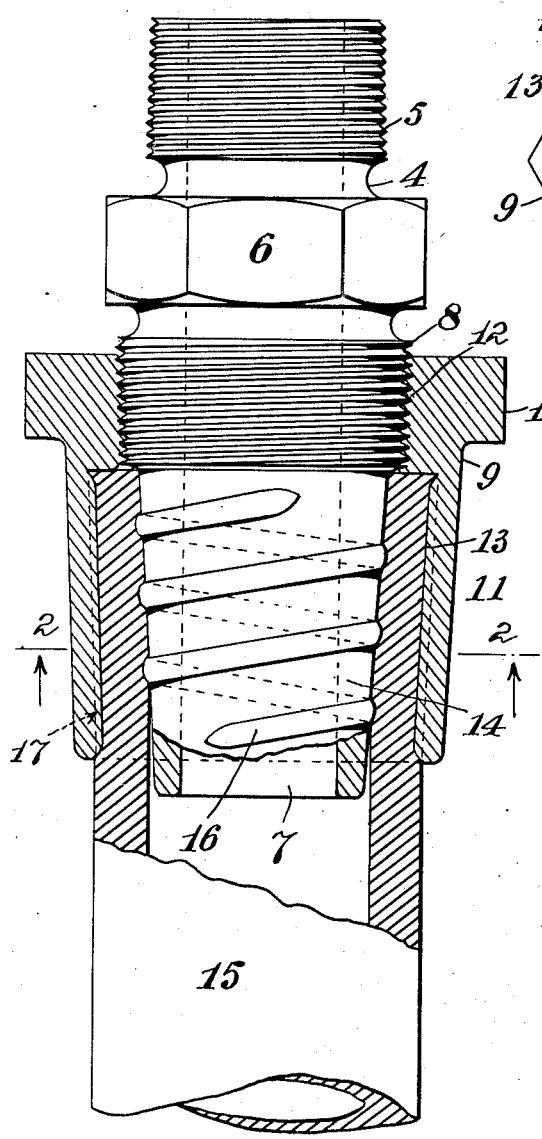
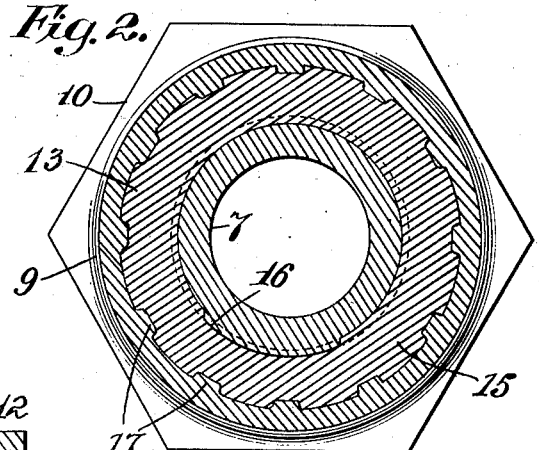
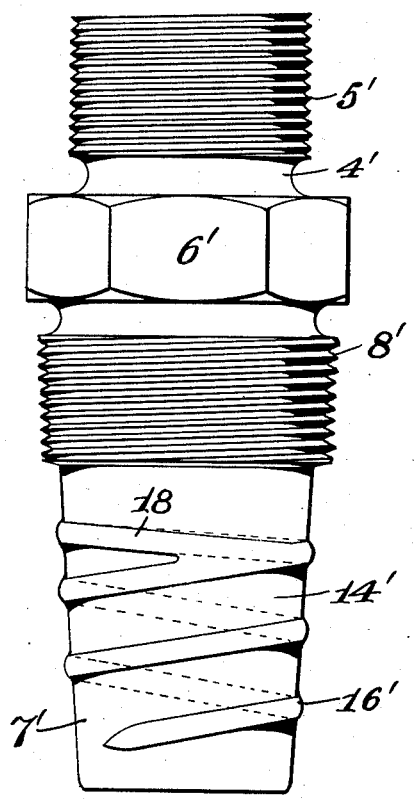
Inventor:
Claus D. Myer,

UNITED STATES PATENT OFFICE.

CLAUS D. MYER, OF JERSEY CITY, NEW JERSEY, ASSIGNOR TO SIMPLEX HOSE CONNECTION CO., OF JERSEY CITY, NEW JERSEY, A CORPORATION OF NEW JERSEY.

HOSE CONNECTION.

1,006,671.  Specification of Letters Patent.  Patented Oct. 24, 1911.

Application filed November 21, 1910. Serial No. 593,467.

*To all whom it may concern:*

Be it known that I, CLAUS D. MYER, a citizen of the United States, residing at Jersey City, in the county of Hudson and State of New Jersey, have invented a new and useful Hose Connection, of which the following is a specification.

This invention relates to hose connections, and especially to connections adapted to secure a flexible tube, as rubber hose, to a metal pipe, or other rigid connection, and has for its object to provide a connection with which a flexible hose of any compressible material may be quickly connected with a rigid part in a manner to prevent the escape of steam, air, or any gas under high pressure, as well as any liquid under a high, or low pressure. The connection is especially designed to form a connection where high pressure is used; but I do not limit myself to that use only for the reason that the construction is such as to enable an operator to make a quick connection where it is desired to connect a flexible, or compressible tube with a rigid body, and for that reason the connection will be found desirable even where only a low pressure is used.

The invention is illustrated in the accompanying drawing, in which—

Figure 1, is a side elevation, partly in section, of a flexible hose connected with a rigid body in accordance with my invention; Fig. 2, is a transverse section thereof, on the line 2—2 of Fig. 1; and, Fig. 3, is an elevation, or longitudinal view of a part shown in Fig. 1, but showing a modified form of construction.

In the drawing, the several parts of my invention are indicated by numerals of reference.

In practice I provide an ordinary pipe fitting, as 4, having a threaded portion, as 5, and faced portion as 6, adapted to be engaged by a wrench,—with a nozzle 7, having a threaded portion 8, which may be tapered from the part 6, toward the end of the nozzle, as shown, whereby a steam-tight connection may be made with a thimble 9, having a squared part 10, and a tapered part 11, said thimble having an opening which is provided with a threaded wall 12, adapted to engage the threaded part 8, of the nozzle. As thus constructed, when the thimble is mounted on the nozzle, a space 13, is left between the tapered part 11, of the thimble, and the part 14, of the nozzle, which is also tapered, as shown. This space 13, is adapted to receive the end of a flexible, or compressible hose 15, the parts being so proportioned that when the hose 15, is in place, it will be compressed to a certain extent between the parts 11, and 14.

To facilitate securing the parts together, or in making the connection, as well as to further insure making a tight joint, I provide the outer surface of the nozzle 7, with a spiral rib 16, of greater pitch than the threads of the part 8 and the interior wall of the part 11, of the thimble 9, is provided with a plurality of longitudinal ribs 17.

In operation, the end of the hose 15, having been inserted in the thimble 9, the part 14, of the nozzle is inserted in the screw-threaded end of the thimble and into the end of the hose 15. Then by turning the nozzle it will be forced into the end of the hose 15, by reason of the spiral rib 16, as will be readily understood, until the threaded part 8, engages the threaded part 12, of the thimble. Then, as the parts 8, and 12, are screwed together, the ribs 17, will prevent the hose 15, turning with the nozzle, and the part 14, of the nozzle will be further forced within the hose, at the same time drawing the hose within the thimble, and compressing the same between the parts 11, and 14, as will be readily understood; thereby making a connection that will stand great pressure without leaking.

While the connection is primarily designed to connect a rubber hose with a steam pipe, I find it valuable for compressed air pipe connections, and also for water under high pressure. It is also evident that as lead can be readily compressed, the connection could be used to connect a lead pipe with a pipe of different metal.

In Fig. 3, the parts 4', 5', 6', 7', 8' and 14', are the same as in Fig. 1; but the spiral 16', is provided with a portion 18, at its upper end whereby the last two turns of the spiral are connected. Thus, if steam should pass upward between the hose 15, and the part 14', within the channel formed by the spiral, the part 18, being embedded in the rubber, or flexible material, would effectually shut off the passage of the steam past this point, and would aid in making a tight connection.

The entire construction is simple, efficient, and easy to manipulate so that a connection may be made between a flexible, or compressible hose and a fixed, or rigid part in a very short time.

Having thus described my invention, what I claim as new and desire to secure by Letters Patent of the United States is—

1. In a hose connection, a nozzle adapted to enter the end of a hose, and a thimble adapted to be secured to said nozzle and engage and compress the end of the hose against the same, said nozzle having a spiral rib formed thereon adapted to engage the inner wall of the hose and draw the end thereof within the thimble, and said thimble having longitudinal ribs formed in the inner wall thereof adapted to engage the hose, for the purpose set forth.

2. In a hose connection, a nozzle adapted to enter the end of a hose, and a thimble adapted to be secured to said nozzle and engage and compress the end of the hose against the same, said nozzle having a spiral rib formed thereon adapted to engage the inner wall of the hose and draw the end thereof within the thimble, and said thimble having longitudinal ribs formed on the inner wall thereof adapted to engage the hose, said nozzle and thimble being both tapered, for the purpose set forth.

3. In a hose connection, a nozzle adapted to enter the end of a hose, and a thimble adapted to be secured to said nozzle and engage and compress the end of the hose against the same, said nozzle having a spiral rib formed thereon adapted to engage the inner wall of the hose, said spiral rib having a connecting portion at one end whereby the spiral channel formed by the rib will be cut off, for the purpose set forth.

4. A hose connection comprising a nozzle having an attaching part, a screw-threaded part, and a tapered part, and having a spiral rib formed on said tapered part running in the same direction as the screw thread of said screw-threaded part adapted to draw the end of the hose within the thimble, and a thimble having longitudinal ribs on the inner wall thereof, and a screw-threaded part adapted to engage said screw-threaded part of the nozzle, the parts being so proportioned that when in position said hose will be compressed between said parts.

5. In a hose connection, a nozzle adapted to enter the end of a hose, and a thimble adapted to be secured to said nozzle and engage and compress the end of the hose against the same, said nozzle having a spiral rib formed thereon adapted to engage the inner wall of the hose and draw the same within the thimble, and said thimble having means to prevent the hose turning while being drawn within the same, for the purpose set forth.

Dated Nov. 19, 1910.

CLAUS D. MYER.

Witnesses:
L. M. JOHNSON,
HENRY H. R. MYER.